United States Patent
Cha et al.

(10) Patent No.: US 11,241,993 B2
(45) Date of Patent: Feb. 8, 2022

(54) VEHICLE WITH EXPANDABLE SPACE

(71) Applicants: HYUNDAI MOTOR COMPANY, Seoul (KR); KIA MOTORS CORPORATION, Seoul (KR)

(72) Inventors: Dong Eun Cha, Hwaseong-si (KR); Jin Ho Hwang, Seoul (KR); Sang Heon Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 280 days.

(21) Appl. No.: 16/567,638

(22) Filed: Sep. 11, 2019

(65) Prior Publication Data

US 2020/0346574 A1 Nov. 5, 2020

(30) Foreign Application Priority Data

Apr. 30, 2019 (KR) .................. 10-2019-0050734

(51) Int. Cl.
| | | |
|---|---|---|
| *B60P 3/34* | (2006.01) | |
| *B60P 3/42* | (2006.01) | |
| *B62D 21/14* | (2006.01) | |
| *B60N 3/00* | (2006.01) | |
| *B60R 16/03* | (2006.01) | |
| *H02J 7/02* | (2016.01) | |
| *B60J 7/16* | (2006.01) | |

(Continued)

(52) U.S. Cl.
CPC .................. *B60P 3/34* (2013.01); *B60J 3/002* (2013.01); *B60J 3/02* (2013.01); *B60J 5/0473* (2013.01);
(Continued)

(58) Field of Classification Search
CPC ...... B60J 5/0473; B60J 7/1642; B60J 7/1657; B60J 3/002; B60N 2/062; B60N 2/01;
(Continued)

(56) References Cited

U.S. PATENT DOCUMENTS 3,710,962 A * 1/1973 Fowler, Jr. ............ B60P 1/4421
  414/545
3,874,527 A * 4/1975 Royce .................... A61G 3/061
  414/537

(Continued)

FOREIGN PATENT DOCUMENTS

GB 2415130 A * 12/2005 ............... B60N 2/14
JP 2-261174 A 10/1990
(Continued)

OTHER PUBLICATIONS

Korean Office Action dated Jul. 15, 2021, issued in corresponding Korean Patent Application No. 10-2019-0050734.

*Primary Examiner* — Jason S Morrow
*Assistant Examiner* — Wenwei Zhuoo
(74) *Attorney, Agent, or Firm* — Morgan, Lewis & Bockius LLP (57) ABSTRACT

A vehicle may include a door pivotally mounted to a vehicle body at a lower end portion of the door, to open or close an opening formed at a portion of one surface of the vehicle, while being configured to form a bottom surface connected to a floor of the vehicle in a state of completely pivoting toward an outside of the vehicle in accordance with an opening operation of the door, forming a terrace space connected to an internal compartment of the vehicle, and a seat slidably mounted in the internal compartment of the vehicle, to provide a seating compartment for passengers, while being configured to be slidable outwards toward the opening of the vehicle, providing a seating compartment in the terrace space when the terrace space is used in accordance with the opening operation of the door.

17 Claims, 6 Drawing Sheets

(51) Int. Cl.
   *B60J 3/02* (2006.01)
   *B60J 3/00* (2006.01)
   *E06B 3/38* (2006.01)
   *B60J 5/04* (2006.01)
   *B60N 2/06* (2006.01)

(52) U.S. Cl.
   CPC ............ *B60J 7/1635* (2013.01); *B60N 2/062* (2013.01); *B60N 3/001* (2013.01); *B60P 3/42* (2013.01); *B60R 16/03* (2013.01); *B62D 21/14* (2013.01); *E06B 3/38* (2013.01); *H02J 7/025* (2013.01); *B60N 2/06* (2013.01)

(58) Field of Classification Search
   CPC ........ B60N 2/012; B60N 3/001; B60N 3/002; B60P 3/34; B60P 3/42; B60P 3/343; B60R 16/03; A61G 3/02; A61G 3/06; E06B 3/38
   USPC ............... 296/26.15, 163, 64, 68, 65.11, 162
   See application file for complete search history.

(56) References Cited

U.S. PATENT DOCUMENTS

| | | | | |
|---|---|---|---|---|
| 3,995,890 | A * | 12/1976 | Fletcher | B60P 3/32 296/10 |
| 4,134,504 | A * | 1/1979 | Salas | A61G 3/06 414/522 |
| 5,040,467 | A * | 8/1991 | King | E04B 1/34336 108/42 |
| 5,148,848 | A * | 9/1992 | Murray | B60P 3/343 160/66 |
| 5,524,952 | A * | 6/1996 | Czech | B60N 2/14 296/65.12 |
| 5,921,033 | A * | 7/1999 | Molina | E04B 1/3442 52/67 |
| 6,024,398 | A * | 2/2000 | Horton | B60N 2/062 296/65.07 |
| 6,131,980 | A * | 10/2000 | Sankrithi | B60P 3/42 296/26.08 |
| 6,378,927 | B1 * | 4/2002 | Parry-Jones | B60P 1/435 296/61 |
| 7,686,381 | B1 * | 3/2010 | Leonard | B60P 3/343 296/162 |
| 2006/0145514 | A1 * | 7/2006 | Cardwell | B60P 3/36 296/162 |
| 2015/0246699 | A1 * | 9/2015 | Anabtawi | B60D 1/06 280/511 |

FOREIGN PATENT DOCUMENTS

| | | | |
|---|---|---|---|
| JP | 02261174 A | * 10/1990 | |
| JP | 2005-088811 A | 4/2005 | |
| KR | 10-1437963 B1 | 9/2014 | |
| WO | WO-2005122990 A1 | * 12/2005 | ............... B60N 2/06 |

* cited by examiner

VEHICLE WITH EXPANDABLE SPACE

CROSS-REFERENCE TO RELATED APPLICATION

The present application claims priority to Korean Patent Application No. 10-2019-0050734, filed on Apr. 30, 2019, the entire contents of which is incorporated herein for all purposes by this reference.

BACKGROUND OF THE INVENTION

Field of the Invention

The present invention relates to a vehicle with an expandable space in which an internal compartment of the vehicle is expandable through extension of a portion of a vehicle body of the vehicle to the outside of the vehicle.

Description of Related Art

To cope with an increase in people enjoying outdoor activities according to an increase in leisure activities in recent years, demand for vehicles not only having a simple function as a traveling means, but also having a function of providing a rest space, has increased. Furthermore, in some cases, it may be necessary to provide an official space for official outdoor activities.

Most vehicles only provide a space facilitating passengers to be accommodated therein, even though the vehicles have more or less differences in association with such a space in accordance with kinds and sizes thereof. That is, such vehicles do not secure a sufficient space facilitating the user to rest or to perform an official task.

To the present end, it is necessary to provide a vehicle having a new concept configured for securing a sufficient space facilitating the user to rest or to perform an official task under the condition that the internal compartment of the vehicle is insufficient.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle with an expandable space in which an internal compartment of the vehicle is expandable through extension of a portion of a vehicle body of the vehicle to the outside of the vehicle.

In accordance with an aspect of the present invention, the above and other objects may be accomplished by the provision of a vehicle with an expandable space including a door pivotally mounted to a vehicle body at a lower end portion of the door, to open or close an opening formed at a portion of one surface of the vehicle, while being configured to form a bottom surface connected to a floor of the vehicle in a state of completely pivoting toward an outside of the vehicle in accordance with an opening operation of the door, forming a terrace space connected to an internal compartment of the vehicle, and a seat slidably mounted in the internal compartment of the vehicle, to provide a seating compartment for passengers, while being configured to be slidable outwards toward the opening of the vehicle, providing a seating compartment in the terrace space when the terrace space is used in accordance with the opening operation of the door.

The seat may be slidable outwards toward the opening of the vehicle, and may be rotatable.

The bottom surface of the door connected to the floor of the vehicle in accordance with the opening operation of the door may be flush with the floor of the vehicle.

The vehicle may further include a roof coupled to an upper end portion of the door to form a L-shape with the door, to selectively close a portion of a top section of the opening, the roof configured of pivoting with the door during the opening operation of the door such that the roof is disposed at one side of the terrace space.

The vehicle may further include a support panel mounted at the roof while being pivotable upwards of the vehicle about a rotation shaft disposed at a rear end portion thereof. The support panel may have a front end portion pivotable upwards of the vehicle in an opened state of the door such that the front end portion thereof is spaced from the door, forming a table in the terrace space.

The vehicle may further include a power supply unit mounted at the support panel, and configured to supply electric power to an electronic appliance.

The power supply unit may be provided with a wireless charging system such that electric power is supplied to an electronic appliance by the power supply unit when the electronic appliance is disposed on the support panel.

The vehicle may further include a sliding panel mounted under the floor of the vehicle while having a panel shape. The sliding panel may be slidable toward the outside of the vehicle in an opened state of the door, forming the bottom surface connected to the floor of the vehicle while being supported by the door at a lower surface thereof.

When the vehicle further includes a roof coupled to an upper end portion of the door to form a L-shape with the door, to selectively close a portion of a top section of the opening, the roof configured of pivoting with the door during the opening operation of the door such that the roof is disposed at one side of the terrace space, the sliding panel may be slidable to the roof in the opened state of the door.

The vehicle may further include a guide formed at the floor of the vehicle, and a moving panel slidably coupled to the guide while supporting the seat mounted on an upper surface thereof. The moving panel may be slidable outwards of the vehicle along the guide, when the sliding panel has slid outwards of the vehicle, such that the moving panel moves to a predetermined position over the sliding panel.

The vehicle may further include a sunshade mounted at a portion of a top section of the vehicle body and configured to be deployed in an opened state of the door, to form a shade in the terrace space.

The sunshade may be deployed to be inclined upwards from a horizontal position of the vehicle.

When the terrace space is to be formed, the door may pivot toward the outside of the vehicle such that the door is disposed in parallel to the floor of the vehicle, and the sliding panel may then slide toward the outside of the vehicle.

When the terrace space is to be closed, the sliding panel may slide toward the inside of the vehicle such that the sliding panel is inserted into a space defined under the floor of the vehicle, and the door may then pivot toward the inside of the vehicle, closing the opening of the vehicle.

In accordance with various aspects of the present invention, the following effects may be provided.

In the vehicle with an expandable space according to an exemplary embodiment of the present invention, it may be possible to expand the internal compartment of the vehicle through extension of a portion of the vehicle body to the outside of the vehicle.

In particular, as an additional space is secured, there may be an advantage in that a rest space or an official space may be secured in outdoors.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
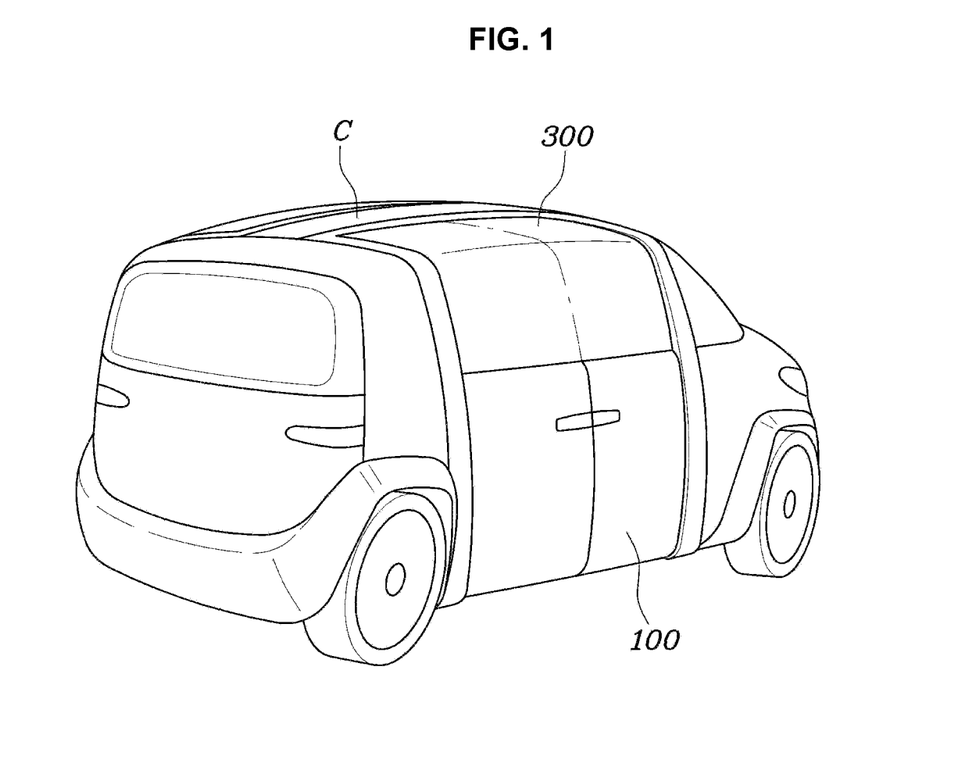
FIG. 1 is a view exemplarily illustrating a state in which a door of a vehicle with an expandable space according to an exemplary embodiment of the present invention closes a side surface of the vehicle.
Figure 2:
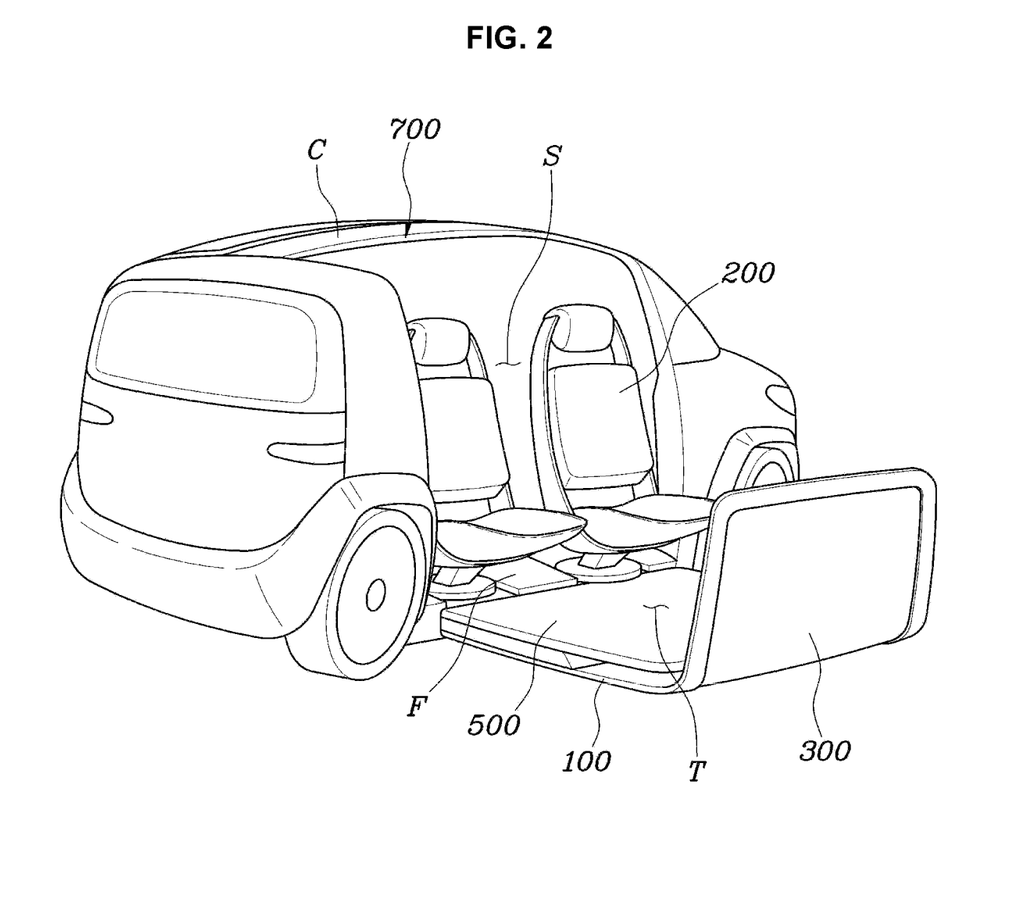
FIG. 2 is a view exemplarily illustrating a state in which a terrace space is formed at the vehicle with the expandable space according to the exemplary embodiment of the present invention.
Figure 3:
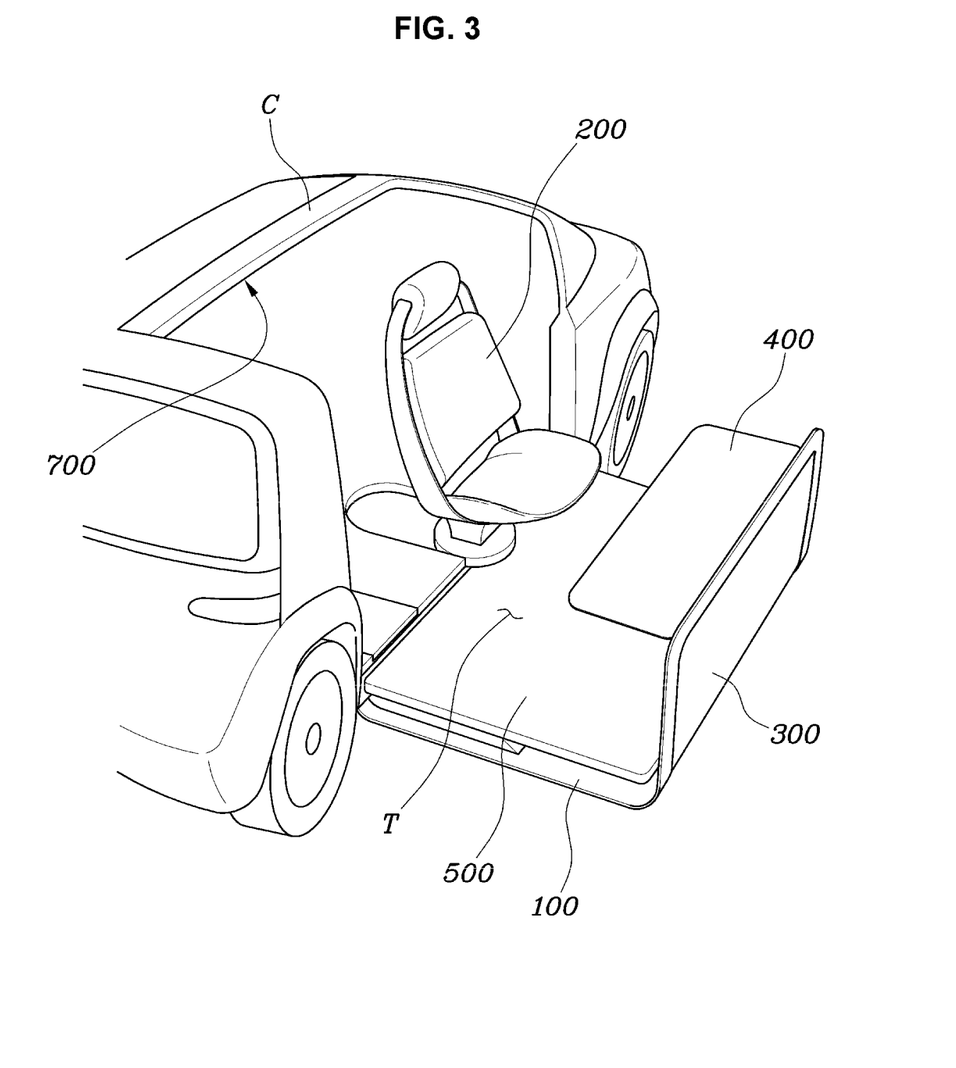
FIG. 3 is a view exemplarily illustrating a support panel in the vehicle with the expandable space according to the exemplary embodiment of the present invention.
Figure 4:
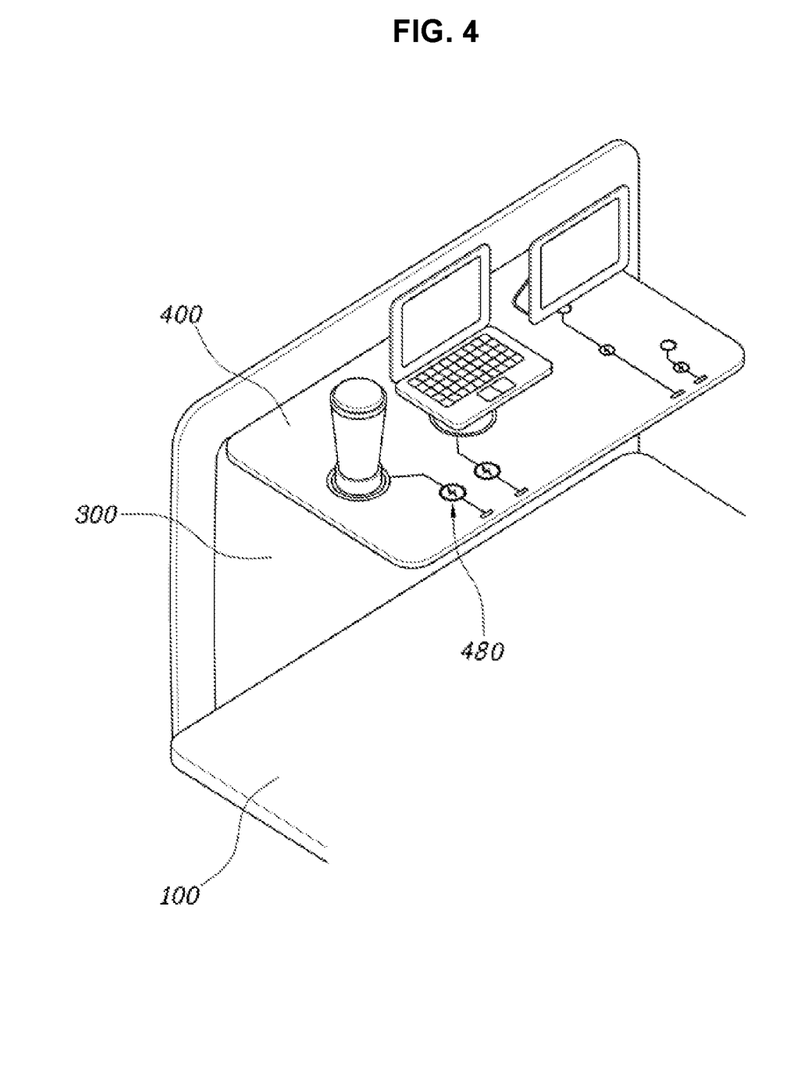
FIG. 4 is a view exemplarily illustrating a power supply unit in the vehicle with the expandable space according to the exemplary embodiment of the present invention.
Figure 5:
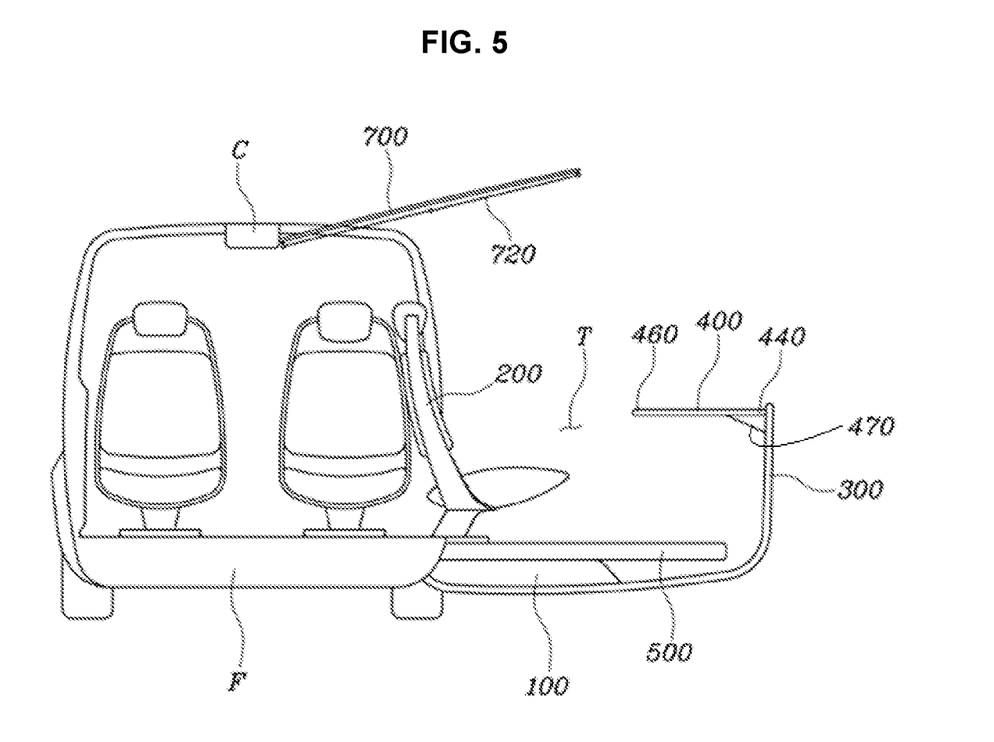
FIG. 5 is a view exemplarily illustrating a sun shade in the vehicle with the expandable space according to the exemplary embodiment of the present invention.
Figure 6:
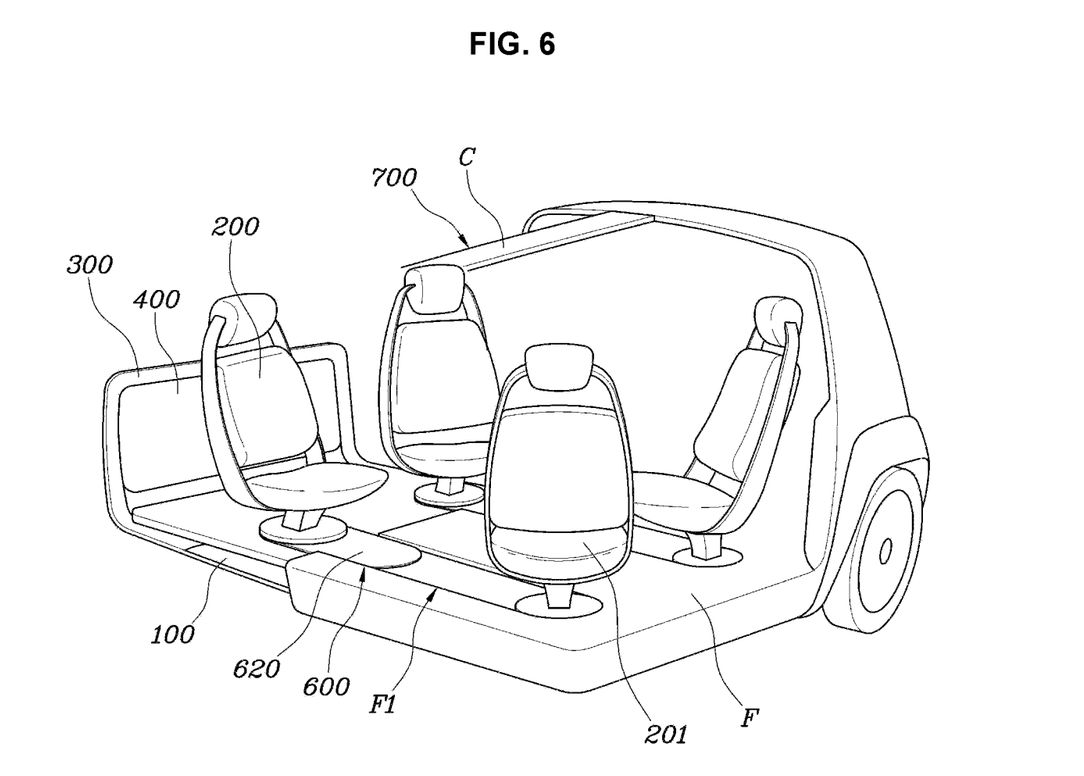
FIG. 6 is a view exemplarily illustrating a moving panel in the vehicle with the expandable space according to the exemplary embodiment of the present invention.

FIG. 1 is a view exemplarily illustrating a state in which a door of a vehicle with an expandable space according to an exemplary embodiment of the present invention closes a side surface of the vehicle. FIG. 2 is a view exemplarily illustrating a state in which a terrace space is formed at the vehicle with the expandable space according to the exemplary embodiment of the present invention. FIG. 3 is a view exemplarily illustrating a support panel in the vehicle with the expandable space according to the exemplary embodiment of the present invention. FIG. 4 is a view exemplarily illustrating a power supply unit in the vehicle with the expandable space according to the exemplary embodiment of the present invention. FIG. 5 is a view exemplarily illustrating a sun shade in the vehicle with the expandable space according to the exemplary embodiment of the present invention. FIG. 6 is a view exemplarily illustrating a moving panel in the vehicle with the expandable space according to the exemplary embodiment of the present invention.

As illustrated in FIG. 1 and FIG. 2, the vehicle with the expandable space according to the exemplary embodiment of the present invention includes a door 100 configured to pivot about a rotation shaft disposed at a lower end portion thereof, to open or close an opening S formed at a portion of one surface of the vehicle, while being configured to form a bottom surface connected to a floor F of the vehicle in a state of completely pivoting toward the outside of the vehicle in accordance with an opening operation of the door, forming a terrace space T connected to an internal compartment of the vehicle. The vehicle also includes a seat 200 mounted in the internal compartment of the vehicle, to provide a seating compartment for passengers, while being configured to be slidable outwards toward the opening S of the vehicle, providing a seating compartment in the terrace space T when the terrace space T is used in accordance with the opening operation of the door 100.

In accordance with the exemplary embodiment of the present invention, the door 100 is provided. As illustrated in FIG. 1 and FIG. 2, the door 100 may close the opening S formed at a portion of one surface of the vehicle. The opening S may be formed at a front, rear, left or right side of the vehicle. The opening S of the vehicle is opened or closed in accordance with pivoting of the door 100. Meanwhile, the present invention is also applicable to conventional vehicles. Furthermore, the present invention is applicable to a vehicle provided with a driverless operation system such as an autonomous vehicle. Although doors are mounted at opposite lateral sides of the vehicle with reference to a forward advance direction of the vehicle in the case of FIG. 1, such doors may also be mounted at a front or rear side of the vehicle as well as opposite lateral sides of the vehicle. That is, one surface of the vehicle has a concept including all surfaces mounted at front, rear, left and right sides of the vehicle.

Referring to FIG. 1 and FIG. 2, the door 100 closes the opening S formed at a portion of one surface of the vehicle, or opens the opening S. The door 100 may pivot toward the outside of the vehicle about the rotation shaft disposed at the lower end portion thereof, opening the opening S of the vehicle. Although the rotation shaft is not shown, the rotation shaft is provided at the lower end portion of the door 100. The rotation shaft may be rotated by a motor or the like, pivoting the door 100. In an opened state of the opening S, the door 100 may pivot toward the inside of the vehicle, closing the opening S. In the instant case, the door 100 may form a bottom surface connected to the floor F forming a bottom portion of the vehicle, forming the terrace space T connected to the internal compartment of the vehicle. In accordance with formation of the terrace space T, it may be possible to secure an additional space and, as such, the vehicle may provide a rest space or an official space. Accordingly, when the door 100 is opened, the terrace space T is formed and, as such, passengers may move or rest in the terrace space T.

In an exemplary embodiment of the present invention, a controller is connected to the motor to control the operation of the motor and the controller may be at least one microprocessor operated by a predetermined program which may include a series of commands for carrying out a method in accordance with various exemplary embodiments of the present invention.

Furthermore, in accordance with the exemplary embodiment of the present invention, the seat 200 is provided. The seat 200 is mounted in the internal compartment of the vehicle, providing a seating space for passengers. The seat 200 is also slidable outwards toward the opening S. In the instant case, a guide rail or the like may be mounted on the floor F, and the seat 200 may be mounted on the guide rail. The seat 200 may be slidable toward the outside of the vehicle in accordance with a pushing force from an actuator. Meanwhile, when the terrace space T is usable in accordance with the opening operation of the door 100, the seat 200 may slide toward the terrace space T, providing a seat in the terrace space T. In the instant case, the passenger may sit in the seat 200 within the terrace space T and, as such, there may be an advantage in that the passenger may secure a more convenient environment for rest or performance of an official task.

Meanwhile, as illustrated in FIG. 5, the seat 200 may be slidable outwards toward the opening S of the vehicle, and may be rotatable. In the instant case, the seat 200 may rotate such that the front side of the seat 200 is directed to the outside of the vehicle, as illustrated in FIG. 5. Otherwise, the seat 200 may rotate such that the front side of the seat 200 is directed to the inside of the vehicle, as illustrated in FIG. 5. Meanwhile, in accordance with various aspects of the present invention, the seat 200 may rotate while sliding or may rotate without sliding.

In the exemplary embodiment of the present invention, the bottom surface of the door 100 connected to the floor F of the vehicle in accordance with the opening operation of the door 100 may be flush with the floor F of the vehicle. In the instant case, accordingly, there is no step between the floor F of the vehicle and the bottom surface of the door 100 connected thereto. Accordingly, when the seat 200 slides toward the outside of the vehicle, there may be an advantage in that the seat is movable from the floor F of the vehicle toward the outside of the vehicle along the bottom surface of the door 100 without interference.

Meanwhile, in accordance with the exemplary embodiment of the present invention, as illustrated in FIG. 1 and FIG. 2, the vehicle may further include a roof 300 having a panel shape while being coupled to an upper end portion of the door 100, to selectively close a portion of a top section of the opening. The roof 300 may pivot together with the door 100 during opening of the door 100 such that the roof 300 is mounted at one side of the terrace space T. The roof 300 is coupled to the upper end portion of the door 100. Furthermore, the roof 300 closes a portion of the top section of the vehicle when the door 100 closes the opening S of the vehicle. On the other hand, during opening of the door 100 to open the opening S of the vehicle, the roof 300 pivots together with the door 100, opening the portion of the top section of the vehicle. As the roof 300 pivots together with the door 100 during opening of the door 100, the roof 300 is mounted at one side of the terrace space T. The roof 300 configured as described above may be made of glass such as smart glass adjustable in transparency or may be constituted by a panel made of metal or the like.

In accordance with the exemplary embodiment of the present invention, as illustrated in FIG. 3, FIG. 4, and FIG. 5, the vehicle may further include a support panel 400 mounted at the roof 300 while having a panel shape. The support panel 400 may pivot upwards of the vehicle about a rotation shaft disposed at a rear end portion 440 thereof. In an opened state of the door 100, a front end portion 460 of the support panel 400 may pivot upwards of the vehicle such that the front end portion 460 of the support panel 400 is spaced from the door 100, forming a table in the terrace space T. The support panel 400 is mounted at the roof 300 such that a rear end portion 440 of the support panel 400 is connected to the roof 300, and a front end portion 460 of the support panel 400 is mounted near the roof 300. In an opened state of the door 100, the front end portion 460 of the support panel 400 may pivot upwards of the vehicle about a rotation shaft disposed at the rear end portion 440. Referring to FIG. 5, as the front end portion 460 of the support panel 400 is spaced from the door 100 of the vehicle through pivoting thereof, a table is formed in the terrace space T. Accordingly, goods or the like may be placed on the table and, as such, there may be an advantage in that the terrace space T may efficiently function as a rest space or an official space.

In an exemplary embodiment of the present invention, the panel 400 is pivotally coupled to the roof 300 by at least a link 470 having at least one pivotal axis so as to support the panel 400 against the roof 300 when the support panel 400 is pivoted upwards.

Meanwhile, in accordance with the exemplary embodiment of the present invention, as illustrated in FIG. 4, the vehicle may further include a power supply unit 480 mounted at the support panel 400, to supply electric power to electronic appliances. This will be described in more detail. The power supply unit 480 includes a wireless charging system and, as such, may supply electric power to an electronic appliance when the electronic appliance is disposed on the support panel 400. The wireless charging system may be constituted by a magnetic resonance device or a magnetic induction device. Accordingly, the battery of an electronic appliance or the like may be continuously recharged during rest or performance of an official task of the passenger in the terrace space T and, as such, there may be an advantage in that utility of the terrace space T and utility continuance of the terrace space T may be enhanced.

In accordance with the exemplary embodiment of the present invention, as illustrated in FIGS. 2 and 5, the vehicle may further include a sliding panel 500 mounted under the floor F of the vehicle while having a panel shape. The sliding panel 500 may slide toward the outside of the vehicle in an opened state of the door 100, forming the bottom surface connected to the floor F of the vehicle while being supported by the door 100 at a lower surface thereof. The sliding panel 500 may be inserted into a space defined under the floor F of the vehicle, and may slide toward the outside of the vehicle in an opened state of the door 100. When the sliding panel 500 protrudes outwards of the vehicle in accordance with sliding thereof, the sliding panel 500 forms the bottom surface connected to the floor F of the vehicle. In the instant state, the sliding panel 500 is supported by the door 100 at the lower surface thereof and, as such, secures sufficiency stiffness even when passengers move thereon. Accordingly, there may be an advantage in that, even when passengers move in the terrace space T, contamination of the glass provided at the door 100 and damage to the glass may be prevented.

In accordance with the exemplary embodiment of the present invention, when the vehicle further includes the roof 300, which has a panel shape while being coupled to an upper end portion of the door 100, to close a portion of the top section of the vehicle, and pivots together with the door 100 during opening of the door 100 such that the roof 300 is mounted at one side of the terrace space T, the sliding panel 500 may slide to the roof 300 in an opened state of the door 100, as illustrated in FIG. 5. As the sliding panel 500 slides to the roof 300 in an opened state of the door 100, there may be an advantage in that a maximum space allowing passengers to move therein may be secured in the terrace space T.

Furthermore, in accordance with the exemplary embodiment of the present invention, as illustrated in FIG. 6, the vehicle may further include a guide F1 formed at the floor F of the vehicle, and a moving panel 600 slidably coupled to the guide F1 while supporting the seat 200 mounted on an upper surface 620 thereof. The moving panel 600 may slide outwards of the vehicle along the guide F1, under the condition that the sliding panel 500 has slid outwards of the vehicle, such that the moving panel 600 may move to a position over the sliding panel 500.

The guide F1 may have a groove shape formed at the floor F. The moving panel 600 is mounted at the guide F1 such that the moving panel 600 is slidable outwards or inwards of the vehicle along the guide F1. Accordingly, the seat 200 mounted on the upper surface 620 of the moving panel 600 is also slidable together with the moving panel 600 outwards or inwards of the vehicle. Referring to FIG. 6, four seats are provided. Of course, four or more seats may be mounted in accordance with a provided design of the vehicle. Under the condition that the sliding panel 500 has slid outwards of the vehicle, the moving panel 600 may slide outwards of the vehicle along the guide F1 and, as such, may move to a position over the sliding panel 500.

Meanwhile, when the moving panel 600 moves to a predetermined position over the sliding panel 500, the seat 200 mounted on the moving panel 600 is moved together with the moving panel 600 outwards of the vehicle and, as such, a certain distance is secured between the seat 200 and another seat 201 mounted at the same guide F1 as the seat 200, as illustrated in FIG. 6. Accordingly, a space is formed through sliding of the seat 200 in a direction toward the outside of the vehicle. Thus, there may be an advantage in that a more pleasant space may be secured in the case in which passengers talk or have an official conference.

In an exemplary embodiment of the present invention, the seat 200 is rotatably coupled on the moving panel 600.

Furthermore, in accordance with the exemplary embodiment of the present invention, as illustrated in FIG. 5, the vehicle may further include a sunshade 700 mounted at a portion C of a top body section of the vehicle and configured to be deployed in an opened state of the door 100, to form a shade in the terrace space T. The sunshade 700 is provided at the portion C of the top body section of the vehicle. Referring to FIGS. 1 and 5, the sunshade 700 is mounted at the portion C of the top body section connecting a front section of the vehicle and the rear section of the vehicle. Accordingly, when the sunshade 700 is deployed, the sunshade 700 is mounted over the terrace space T and, as such, a shade may be formed in the terrace space T. Thus, there may be an advantage in that passengers may be protected from a direct ray of light or rain when the passengers rest or perform an official task.

This will be described in more detail. As illustrated in FIG. 5, in accordance with the exemplary embodiment of the present invention, the sunshade 700 may be deployed to be inclined upwards from a horizontal position of the vehicle. When the sunshade 700 is configured to be deployed as described above, a separate support member such as a link 720 is provided to support the sunshade 700. The link 720 may operate to be folded or unfolded. When the link 720 is unfolded, the sunshade 700, which is in a deployed state, is supported by the link 720. Of course, various systems or structures may be provided to support the deployed sunshade 700, in place of the link 720. As the sunshade 700 is deployed to be inclined upwards from a horizontal position, it may be possible to increase the maximum height allowing passengers to move in the terrace space T under the condition that the sunshade 700 is mounted over the terrace space T. Consequently, the maximum movement allowance height of the terrace space T becomes higher than the height of the internal compartment of the vehicle and, as such, there may be an advantage in that it may be possible to reduce a danger of head striking of passengers when the passengers move in the terrace space T.

When it is desired to form a terrace space in the vehicle, in which space expansion is possible in accordance with various aspects of the present invention, as illustrated in FIG. 1 and FIG. 2, the door thereof may pivot toward the outside of the vehicle such that the door may be mounted in parallel to the floor of the vehicle, and the sliding panel may then slide toward the outside of the vehicle. That is, upon sliding of the sliding panel, pivoting of the door may be conducted before sliding of the sliding panel to prevent the door and the sliding panel from being broken or subjected to damage due to interference occurring therebetween during sliding of the sliding panel. To the present end, sliding of the sliding panel may be conducted after the door is positioned in parallel to the floor of the vehicle.

Furthermore, when it is desired to close the terrace space in the vehicle, in which space expansion is possible in accordance with various aspects of the present invention, as illustrated in FIG. 1 and FIG. 2, the sliding panel may slide toward the inside of the vehicle such that the sliding panel is inserted into a space defined under the floor of the vehicle, and the door may then pivot toward the inside of the vehicle, closing the opening of the vehicle. That is, upon pivoting of the door toward the inside of the vehicle, sliding of the sliding panel may be conducted before pivoting of the door to prevent the door and the sliding panel from being broken or subjected to damage due to interference occurring therebetween during pivoting of the door. To the present end, pivoting of the door toward the inside of the vehicle may be conducted after the sliding panel is inserted into the space under the floor of the vehicle.

As apparent from the above description, in the vehicle with an expandable space according to an exemplary embodiment of the present invention, it may be possible to expand the internal compartment of the vehicle through extension of a portion of the vehicle body to the outside of the vehicle.

In particular, as an additional space is secured, there may be an advantage in that a rest space or an official space may be secured in outdoors.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle with an expandable space, the vehicle comprising:
   a door pivotally mounted to a vehicle body at a lower end portion of the door, to open or close an opening formed at a portion of a surface of the vehicle, while being configured to form a bottom surface connected to a floor of the vehicle in a state of pivoting toward an outside of the vehicle in accordance with an opening operation of the door, forming a terrace space connected to an internal compartment of the vehicle;
   a seat slidably mounted in the internal compartment of the vehicle, to provide a seating compartment for passengers, while being configured to be slidable outwards toward the opening of the vehicle, and providing a seating compartment in the terrace space when the terrace space is used in accordance with the opening operation of the door; and
   a roof coupled to an upper end portion of the door to form a L-shape with the door, to selectively close a portion of a top section of the opening, the roof configured of pivoting with the door during the opening operation of the door such that the roof is disposed at a side of the terrace space.

2. The vehicle according to claim 1,
   wherein the seat is slidable outwards toward the opening of the vehicle, and is rotatable with respect to the floor.

3. The vehicle according to claim 1,
   wherein the bottom surface of the door connected to the floor of the vehicle is positioned to be flush with the floor of the vehicle when the door is open.

4. The vehicle according to claim 1, further including:
   a support panel including a first end portion pivotally mounted on the roof and a second end portion selectively pivotable upwards of the vehicle with respect to the first end portion in an opened state of the door such that the second end portion is spaced from the door, forming a table in the terrace space in the opened state of the door.

5. The vehicle according to claim 4, further including:
   a power supply unit mounted at the support panel, and configured to supply electric power to an electronic appliance.

6. The vehicle according to claim 5,
   wherein the power supply unit is provided with a wireless charging system such that electric power is supplied to the electronic appliance by the power supply unit when the electronic appliance is disposed on the support panel.

7. A vehicle with an expandable space, the vehicle comprising:
   a door pivotally mounted to a vehicle body at a lower end portion of the door, to open or close an opening formed at a portion of a surface of the vehicle, while being configured to form a bottom surface connected to a floor of the vehicle in a state of pivoting toward an outside of the vehicle in accordance with an opening operation of the door, forming a terrace space connected to an internal compartment of the vehicle;
   a seat slidably mounted in the internal compartment of the vehicle, to provide a seating compartment for passengers, while being configured to be slidable outwards toward the opening of the vehicle, and providing a seating compartment in the terrace space when the terrace space is used in accordance with the opening operation of the door; and
   a sliding panel mounted under the floor of the vehicle and slidable toward the outside of the vehicle in an opened state of the door, forming the bottom surface connected to the floor of the vehicle while being supported by the door at a lower surface of the sliding panel.

8. The vehicle according to claim 7, further including:
   a roof coupled to an upper end portion of the door to form a L-shape with the door, and configured to selectively close a portion of a top section of the opening,
   wherein the roof is configured of pivoting with the door with respect to the vehicle body during the opening operation of the door such that the roof is disposed at a side of the terrace space, and
   wherein the sliding panel is slidable to the roof in the opened state of the door.

9. The vehicle according to claim 7, further including:
   at least a guide formed at the floor of the vehicle; and
   a moving panel slidably coupled to the at least a guide while supporting the seat mounted on an upper surface of the moving panel,
   wherein the moving panel is configured to be slidable outwards of the vehicle along the at least a guide, when the sliding panel has slid outwards of the vehicle, such that the moving panel moves to a predetermined position over the sliding panel.

10. The vehicle according to claim 9, wherein the at least a guide is a groove into which the moving panel is slidably received.

11. The vehicle according to claim 9,
    wherein the seat is rotatably mounted at a first end portion of the moving panel, and
    wherein the first end portion of the moving panel is positioned opposite to a second end portion of the moving panel, which faces another seat mounted on a same guide in which the seat is mounted, among the at least a guide.

12. The vehicle according to claim 9, wherein the at least a guide is aligned along a width direction of the vehicle.

13. The vehicle according to claim 9, wherein the seat is rotatably coupled to the moving panel.

14. The vehicle according to claim 1, further including:
    a sunshade mounted at a portion of a top section of the vehicle body and configured to be deployed in an opened state of the door, to form a shade in the terrace space.

15. The vehicle according to claim 14,
wherein the sunshade is configured to be deployed to be inclined upwards from a horizontal position of the vehicle.

16. The vehicle according to claim 7,
wherein, in order to form the terrace space, the door is configured to be pivoted toward the outside of the vehicle such that the door is positioned in parallel to the floor of the vehicle, and then the sliding panel is configured to slide toward the outside of the vehicle.

17. The vehicle according to claim 16,
wherein, in order to close the terrace space, the sliding panel is configured to slide toward an inside of the vehicle such that the sliding panel is inserted into a space defined under the floor of the vehicle, and then the door is configured to be pivoted toward the inside of the vehicle, closing the opening of the vehicle.

* * * * *